United States Patent [19]

Tani

[11] Patent Number: 4,475,418

[45] Date of Patent: Oct. 9, 1984

[54] WIRE STRIPPER

[75] Inventor: Isamu Tani, Nagoya, Japan

[73] Assignee: Kabushiki Kaisha Nagoya Boki Seisakusho, Aichi, Japan

[21] Appl. No.: 337,705

[22] Filed: Jan. 7, 1982

[30] Foreign Application Priority Data

Jan. 24, 1981 [JP] Japan .................................. 56-9438

[51] Int. Cl.³ ............................................... H02G 1/12
[52] U.S. Cl. ..................................... 81/9.5 A; 81/9.51
[58] Field of Search .................... 81/9.5 A, 9.5 R, 9.51

[56] References Cited

U.S. PATENT DOCUMENTS 3,564,952  2/1971  Metcalf .............................. 81/9.5 A
3,994,188  11/1976 Baba et al. ........................... 81/9.51
4,261,230  4/1981  Sindelar .............................. 81/9.51

Primary Examiner—Roscoe V. Parker

[57] ABSTRACT

A wire stripper having a pair of grips includes a clamping mechanism for clamping an insulating sheath of an electrical wire in association with actuation of the grips, and a cutting mechanism incorporating a pair of cutters for stripping the insulating sheath and adapted to move up and down in the opposite direction relative to each other so as to twist the insulating sheath. The wire stripper further includes a pair of separating members interposed between the clamping mechanism and the cutting mechanism and normally placed in their closed position. The separating members are effective to separate the clamping mechanism from the cutting mechanism when the grips are brought into their closed position.

8 Claims, 18 Drawing Figures

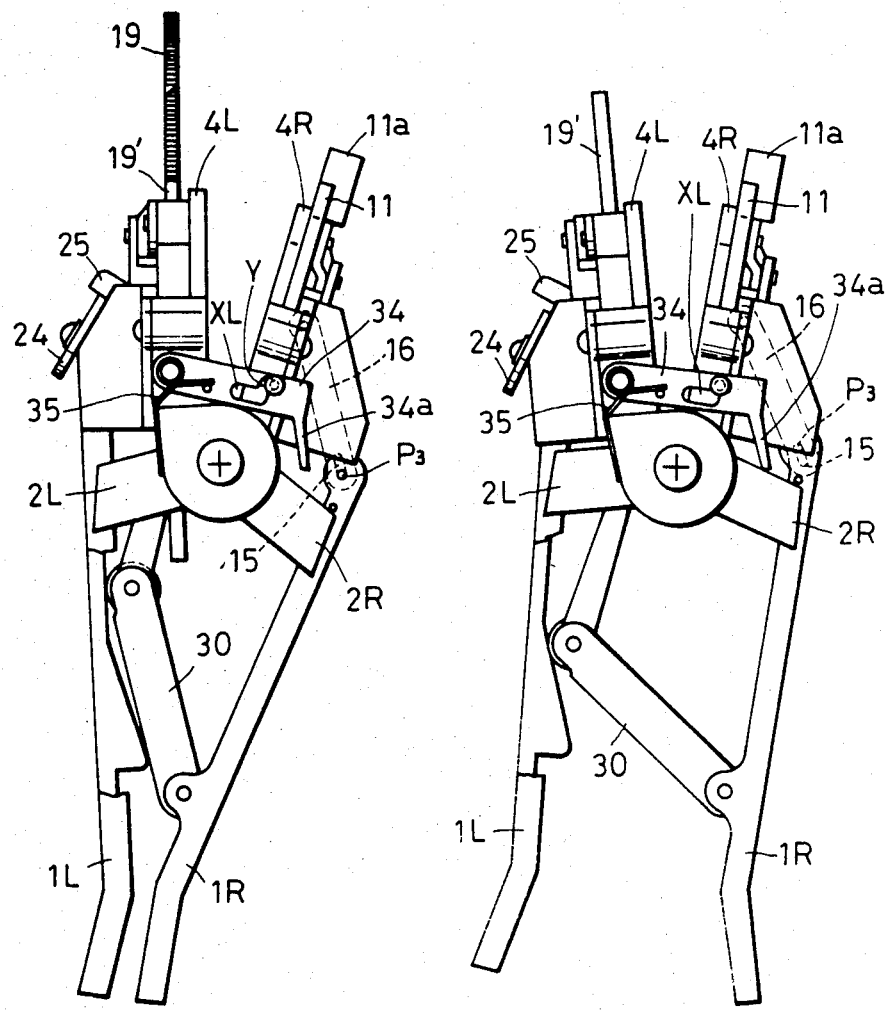

WIRE STRIPPER

BACKGROUND OF THE INVENTION

1. Field of the Invention

This invention relates to a wire stripper for stripping an insulating sheath of an electrical wire.

2. Description of the Prior Art

The conventional type of wire stripper is intended for merely stripping an insulating sheath of an electrical wire, which raises a problem that the core wire is liable to become asunder when exposed after the removal of the insulating sheath. The core wire must be necessarily twisted by the operator to ensure proper electrical connection to be followed.

SUMMARY OF THE INVENTION

In view of the problem associated with the prior art, it is a primary object of the present invention to provide a novel wire stripper which is capable of simultaneously stripping the insulating sheath of an electrical wire and twisting the same by a simple gripping operation thereof.

Another object is to provide a wire stripper which enhances the accommodation of a wide range of wire sizes.

According to the invention, there is provided a wire stripper, in which a pair of stripping cutters are adapted to strip the insulating sheath of an electrical wire and simultaneously twist the core wire while the cutters move up and down in an opposite direction relative to each other.

Various general and specific objects, advantages and aspects of the invention will become apparent when reference is made to the following detailed description considered in conjunction with the accompanying drawings.

BRIEF DESCRIPTION OF THE DRAWINGS

The accompanying drawings illustrate a preferred embodiment of the invention, and wherein:

FIGS. 9(a) through 9(d) are detail views of the base plates in various phases of separating and returning operation.

DETAILED DESCRIPTION OF THE PREFERRED EMBODIMENT

Figure 1:
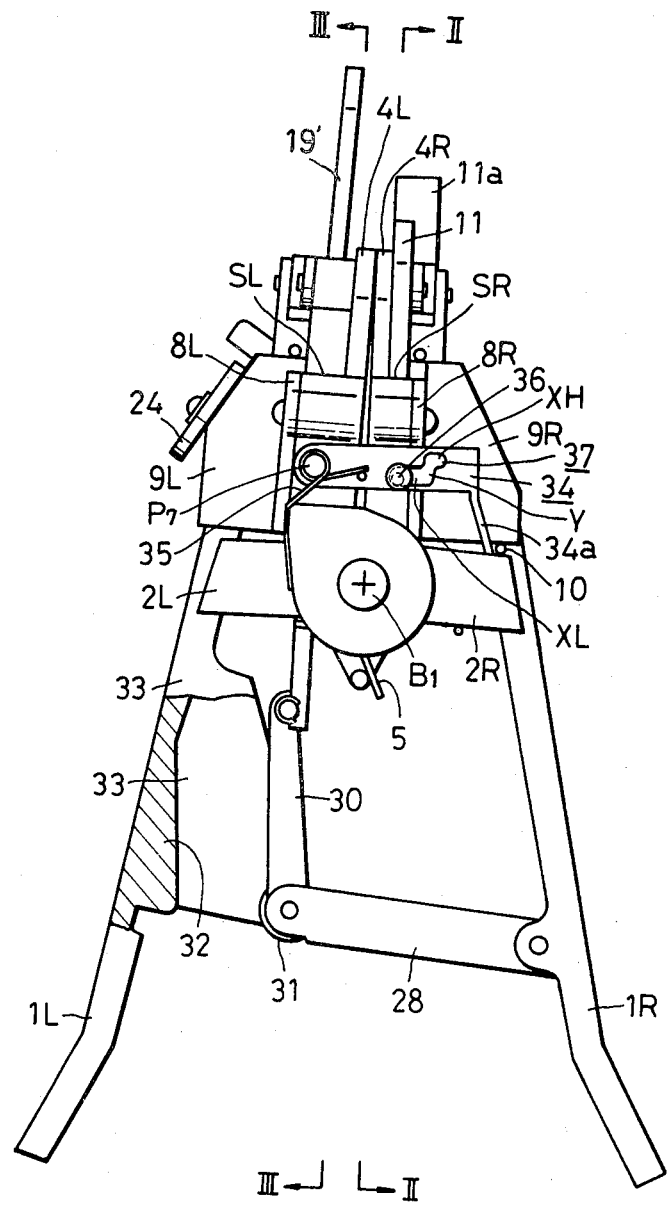
FIG. 1 is a front elevational view of a wire stripper according to the present invention.
Figure 2:
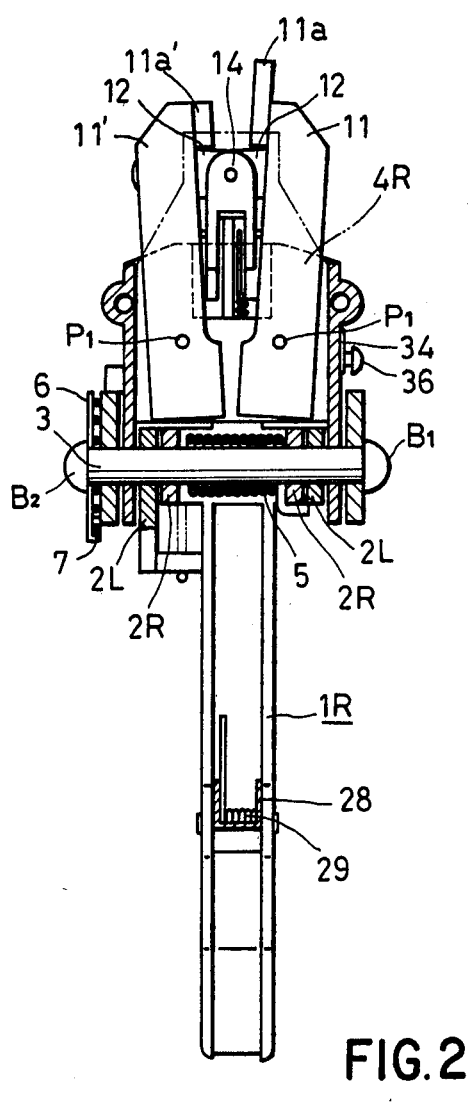
FIG. 2 is a cross-sectional view taken generally along line II—II of FIG. 1.
Figure 3:
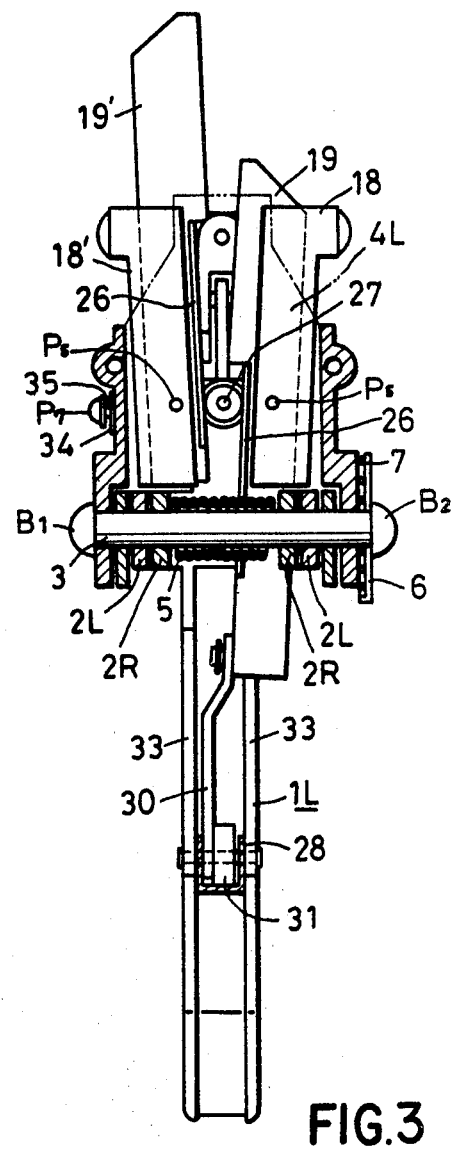
FIG. 3 is a cross-sectional view taken generally along line III—III of FIG. 1.

Referring to the drawings and to FIGS. 1 through 3 in particular, there is shown a wire stripper which is the subject of the present invention. The wire stripper includes at its generally lower portion a pair of grips 1L and 1R which are generally of U-shaped configuration in transverse cross-section. Each of the grips 1L and 1R has a pair of connecting pieces 2L and 2R, respectively, connected as by welding to generally upper portions thereof and extending horizontally therefrom to form a generally U-shaped configuration in transverse cross section. The connecting pieces 2L and 2R are connected by a center pin 3 (see FIG. 2) about which the pieces 2L and 2R are pivotable so as to bring the grips 1L and 1R into a so-called leg-closing position. The center pin 3 carries thereon a torsion spring 5 (also called a torque spring), both ends of which being engaged with a portion of each of the connecting pieces 2L and 2R. The torsion spring 5 urges the grips 1L and 1R in a leg-opening direction at all times.

Reference numerals 4L and 4R are a pair of base plates opposedly disposed at a generally top portion of the grips 1L and 1R. The respective lower portion of the base plates 4L and 4R are spaced away from each other in a progressive number so as to form a yoke-like configuration, as seen in FIG. 1, and ultimately connected together by the center pin 3. The upper opposing faces of the base plates 4L and 4R are formed in a mountain-like configuration, and the lower opposing faces thereof are generally square in configuration. Both sides of each square portion is bent horizontally outwardly, each of the outer ends being covered by cover plates 8L and 8R respectively. Thus, the lower back surfaces of the base plates 4L and 4R, in cooperation with the cover plates 8L and 8R, define housing areas SL and SR for enclosing and retaining clamping members 11 and 11', stripping cutters 19 and 19', and so on which will be described in detail hereinafter.

Furthermore, one end of the center pin 3 (as viewed from the front side in FIG. 1) is locked as by a machine screw B1, and the other end (on the back side in FIG. 1), as by a machine screw B2 through a thin dish-like cap 6.

A power spring 7 is resiliently disposed in the cap 6, its ends being operatively engaged with the respective base plates 4L and 4R. Thus, the base plates 4L and 4R are urged relative to each other in a closely contacting direction.

Reference numerals 9L and 9R are each one pair of back plates which are flat and generally triangular, extending from the central portion of the respective cover plates 8L and 8R in a spaced, parallel relation to each other so as to guide the upper end portion of the grips 1L and 1R.

Two stopper pins 10 are provided, one on the grip 1L and one on the grip 1R, at generally upper portion thereof, which are adapted to abut against the undersurface of the respective back plates 9L and 9R so as to limit the leg-opening movement of the grips 1L and 1R caused by the torsion spring 5.

Reference numeral 11 and 11' are a pair of clamping members for clamping an insulating sheath G of a core wire W, each being of a flat and long strip and enclosed vertically in the right-hand housing area SR (see FIG. 1) in parallel, spaced relation to each other. Clamping plates 11a and 11a', of which the opposed areas are different from each other in the present embodiment, are opposedly welded to the upper portion of the opposed side faces of the respective clamping members 11 and 11'. It is to be noted that normally the clamping plates 11a and 11a' are spaced by a predetermined distance.

Supporting pins P1 are provided on the lower portion of the clamping members 11 and 11' so as to permit a slight pivotal movement of the clamping members 11 and 11' relative to the inner wall of the right-hand cover plate 8R.

Figure 4:
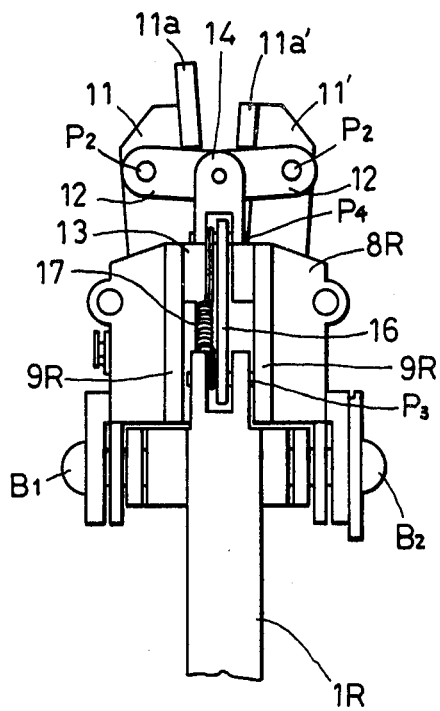
FIG. 4 is a side elevational view showing in greater detail the clamping members and their vicinity of the wire stripper.
Figure 7A:
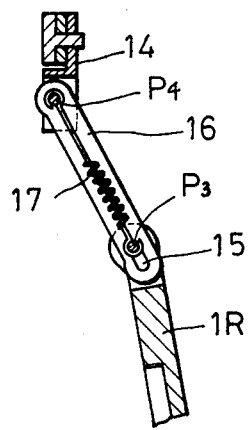
FIGS. 7(a) and 7(b) are schematic views showing the operation of the connecting pin of the wire stripper.
Figure 7B:
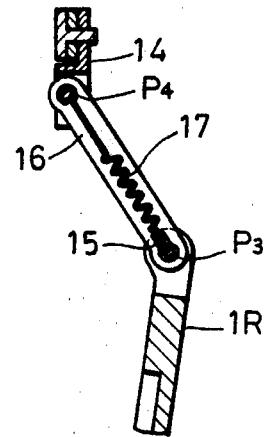

The clamping mechanism of the clamping plates 11a and 11a' according to the present embodiment will now be described, with reference to FIGS. 2, 4 and 7.

The clamping members 11 and 11' have a pair of clamping arms 12, each outer end of which being connected as by pins P2 to the upper outward portion of the respective clamping members 11 and 11'. Each inner end of the clamping arms 12 is pinned to the upper portion of a sliding block 14 adapted to be vertically slidably guided by a guide member 13 which is interposed between the back plates 9R for holding the clamping members 11 and 11'. The lower end of the sliding block 14 is connected as by pin P4 to a connecting lever 16 which in turn is connected to the grip 1R as by pin P3 through a slot 15 formed therein, as most clearly seen in FIG. 7. Furthermore, the sliding block 14 being guided by the guide member 13, is restrained against its downward movement upon completion of clamping the insulating sheath G, so that clamping force exerted by the clamping plates 11a and 11a' may be maintained at substantially constant level.

With continuing reference to FIG. 7, a spring 17 is provided between pins P3 and P4 on the connecting lever 16 in parallel relationship thereto. The spring 17 is given an initial force so that the connecting pin P3 on the grip 1R side may be held at the upper portion of the slot 16 during the movement of the sliding block 14 from normal to downwardly-restrained position.

Attention is now directed to FIG. 3 which is a cross-sectional view taken generally along line III—III of FIG. 1. As generally seen, a pair of casing member 18 and 18', of generally channel-like configuration opening in its vertical direction, are encased in the left-hand housing area SL in vertically parallel, opposed relation relative to each other. Supporting pins P5 are provided on the lower portion of the casing members 18 and 18' so as to permit a slight pivotal movement of the casing members 18 and 18' relative to the inner wall of the left-hand cover plate 8L.

Vertically slidably encased in the channel of the respective casing members 18 and 18' are a pair of stripping cutters 19 and 19' effective to slit and strip the insulating sheath G of the core wire W. The stripping cutters 19 and 19' are disposed in opposing, spaced relation relative to each other, the distance therebetween progressively widening upwardly under the normal start-up condition, as seen in FIG. 3. It is contemplated that the stripping cutters 19 and 19' are actuated to project above the base plate 4L, and especially the left-hand stripping cutter 19' assumes a higher position than does the right-hand stripping cutter 19 in its normal start-up position.

Figure 5:
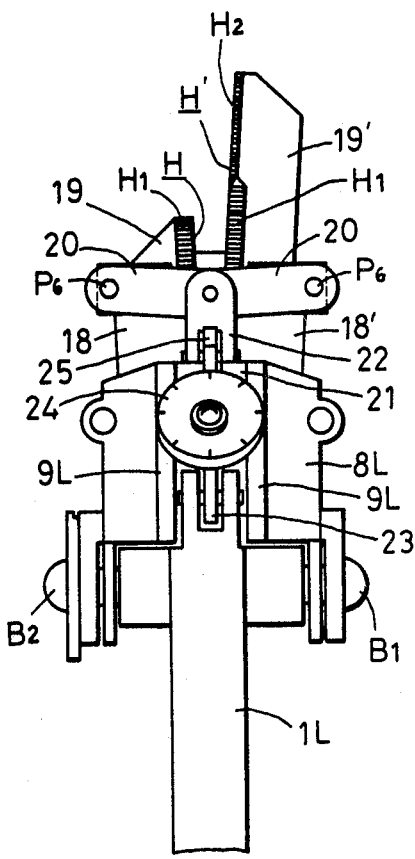
FIG. 5 is a side elevational view showing in greater detail the stripping cutters and their vicinity of the wire stripper.

Referring now to FIG. 5, the mechanism of the stripping cutters 19 and 19' will be described with respect to their clamping action on the insulating sheath G of the core wire W.

The casing members 18 and 18' have a pair of clamping arms 20, each outer end of which being connected as by pins P6 to the upper outward portion of the respective casing members 18 and 18'. Each inner end of the clamping arms 20 is pinned to the upper portion of a sliding block 22 adapted to be vertically slidably guided by a guide member 21 which is interposed between the back plates 9L for holding the casing members 18 and 18'. The sliding block 22 is operatively connected through a connecting lever 23 to the grip 1L. Thus the stripping cutters 19 and 19' each may be approached through the casing member 18 and 18' in association with the gripping operation of the grip 1L.

Additionally, to adjust the amount of approach of both the stripping cutters 19 and 19' relative to the corresponding outside diameter of the insulating sheath G, an adjusting disc 24 is rotatably provided on the rear side portion of the left-hand back plates 9L, its rotational center being positioned eccentrically. Further, the connecting lever 23 has a locking pawl 25 extending outwardly therefrom toward the adjusting disc 24. With this arrangement, the relative distance between the disc 24 and the locking pawl 25 may be adjusted by adjusting the disc 24, and thus the downward stroke of the sliding block 22 may be determined, thereby adjusting the approaching distance of the stripping cutters 19 and 19'.

Figure 6:
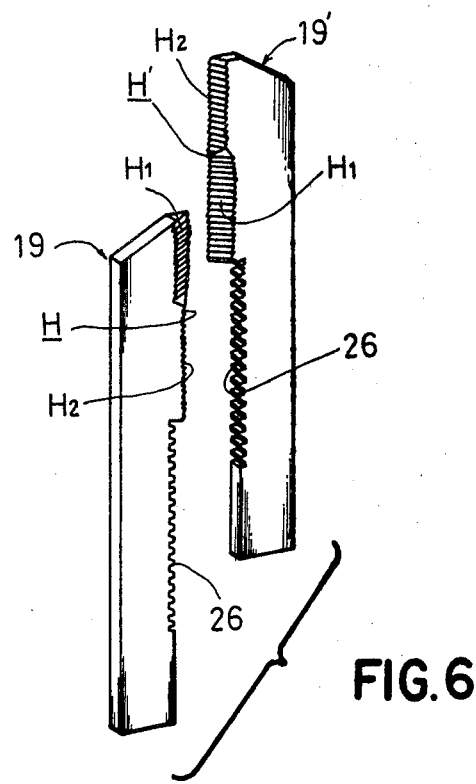
FIG. 6 is a schematic perspective view of the stripping cutters.

As generally seen, stripping edges H and H' are cut on the opposed upper side faces of the stripping cutters 19 and 19', in a file-like configuration, along a predetermined length thereof (about half the length of the cutters 19 and 19', in the present embodiment). However, as will be appreciated by the perspective view of FIG. 6, it is contemplated that the edges H' of the left-hand cutter 19 are so configured as to face upward, while the edges H of the right-hand cutter 19' are so configured as to face downward. Furthermore, it is contemplated that each of the edges H and H' of the cutters 19 and 19' respectively are divided into two substantially equal length of upper and lower portions extending from the rear to the front thereof as viewed in FIG. 6; that is, an "acute portion" H1 having generally acute angle of relief for slitting the insulating sheath G, and an "obtuse portion" H2 having generally obtuse angle of relief for mainly stripping the sheath G and twisting the core wire W. In this embodiment, it is also intended that the left-hand stripping cutter 19 includes the "acute portion" H1 on the upper side thereof and the "obtuse portion" H2 on the lower side, and conversely, the right-hand stripping cutter 19' includes the "obtuse portion" H2 on the upper side thereof and the "acute portion" H1 on the lower side.

The mechanism for actuating up and down the stripping cutters 19 and 19' will now be described.

As generally seen in FIG. 3, racks 26 are provided on the opposed lower side faces adjacent the respective stripping edges H and H' of the cutters 19 and 19' along a predetermined length thereof. Disposed between the cutters 19 and 19' is a pinion 27 rotatably carried in the left-hand housing area SL and adapted for meshing engagement with the racks 26.

Turning to FIG. 1, the grip 1R has at its generally lower portion a swinging lever 28 of generally U-shaped configuration in transverse cross-section, its one end being pinned to the inside of the grip 1R through a torsion spring 29. The other end of the swinging lever 28 is pinned through a guide roller 31 to a push-up lever 30 which in turn is connected to the lower end of stripping cutter 19, as most clearly seen in FIG. 3. To guide the rolling movement of the guide roller 31 smoothly, a guide rail 32 is formed integrally with the left-hand grip 1L on the inner wall thereof, the height of which rail 32 narrowing upward of the grip 1L. Additionally, a pair of guide pieces 33 for guiding the guide roller 31 are provided on both the flange sides of the left-hand grip 1L.

The torsion spring 29 is effective to urge the swinging lever 28 in the downward swinging direction, and the swinging lever 28 is retained against further downward movement through abutment of its lower end with the inner wall of the right-hand grip 1R.

Extending horizontally on both the lower outside surfaces (looking from the front side in FIG. 1) of the base plates 4L and 4R is a slide plate 34 of generally planar configuration, its one end (the left-hand end in FIG. 1) being pivotally pinned as by pin P7 to the outside of the left-hand base plate 4L, and the other end being bent generally downwardly so as to form a leg portion 34a abutting against the right-hand connecting piece 2R in its normal start-up position. Additionally, a torsion spring 35, on the pin P7, is effective to urge the slide plate 34 downwardly, and this downward pivotal movement of the slide plate 34 is restricted upon abutment of the leg portion 34a with the connecting piece 2R.

A slot 37, in the generally central portion of the slide plate 34, is adapted to guide a guide pin 36 provided on the lower outside surface of the right-hand base plate 4R. To this end, the slot 37 is formed in a hook-like configuration in which the upper horizontal path XH communicates with the lower horizontal path XL in a step-like manner through a central vertical path Y. The guide pin 36 is normally situated at the left-hand end (as viewed in FIG. 1) of the lower horizontal path XL, and is reciprocatingly guided along the pathes of the slot 37 during the separating and returning action of the base plates 4L and 4R in response to the stripping action of the stripper.

A further description will be given about the operation of the present embodiment constructed as discussed above, with reference to FIGS. 7(a) and 7(b), 8(a) through 8(f), and 9(a) through 9(d).

Figure 8A:
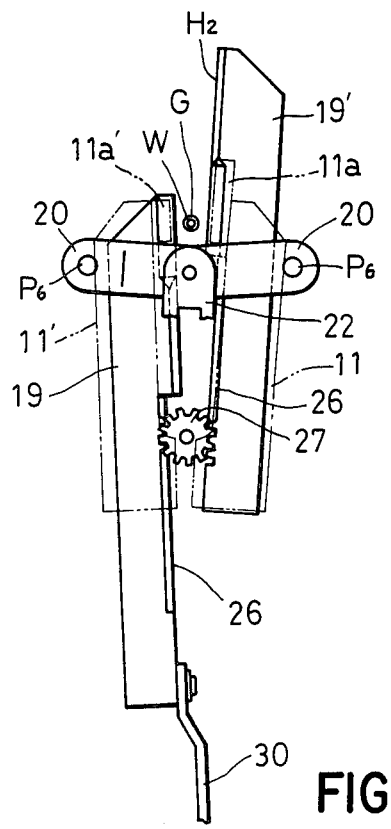
FIGS. 8(a) through 8(f) are detail views of the stripping cutters in various phases of operation.
Figure 8B:
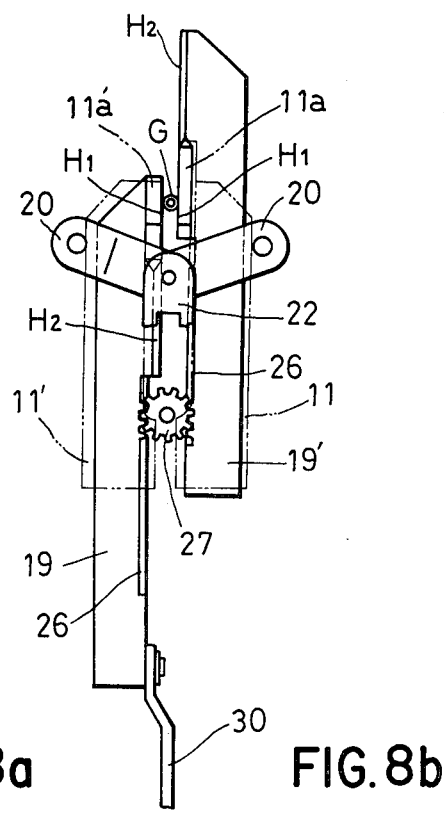

In the first place, the adjusting disc 24 is adjusted in accordance with the diameter of the objective core wire W so as to predetermine the amount of downward stroke of the locking pawl 25. An electric wire with its one end to be cut projecting a predetermined distance outwardly from the stripping cutters 19 and 19', is placed between the cutters 19 and 19', and between the clamping plates 11a and 11a', as shown in FIG. 8(a). With the wire placed in this position, the grips 1L and 1R are grasped to be brought to the closure position until the insulating sheath G is clamped by the clamping plates 11a and 11a' and the stripping cutters 19 and 19' through the actuation of the clamping arms 12 and 20 connected to the grips 1L and 1R respectively, as shown in FIG. 8(b). The locking pawl 25 is the engaged with the adjusting disc 24, thereby locking the grip 1L against its leg-closing motion.

On the other hand, the sliding block 14 on the clamping plates 11a and 11a' sides is locked against downward movement as soon as the insulating sheath G is clamped, thus providing a predetermined amount of clamping force to the insulating sheath G. At this moment, the pin P3 on the grip 1R is initially held at the upper portion of the slot 15 of the connecting lever 16 by the spring 17, and thus the grip 1R is still in its free position, as clearly seen in FIG. 7(a), while the guide roller 31, at the juncture of the swinging lever 28 with the push-up lever 30, abuts against the top slanting portion of the guide rail 32.

Figure 8C:
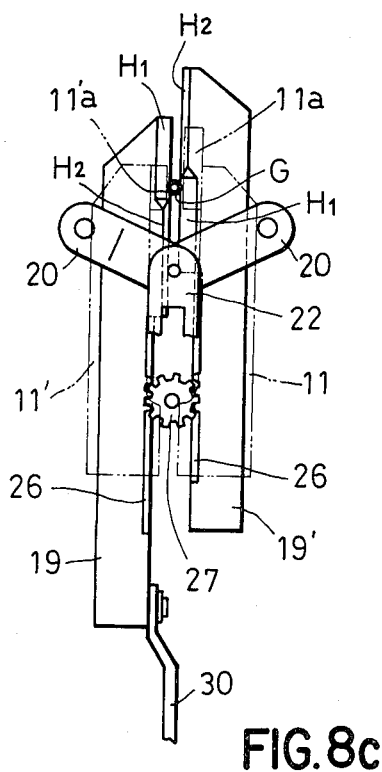

From the clamped position of the insulating sheath G as discussed above, the grip 1R, being in the free position, is further grasped until the pin P3, on the upper end, is engaged with the lower end of the slot 15 in opposition to the spring 17. This causes the guide roller 31 to roll upwardly along the slant on the guide rail 32, thereby raising the push-up lever 30 and the stripping cutter 19 connected thereto. In cooperation with this movement of the stripping cutter 19, the other stripping cutter 19' is moved downwardly through the pinion 27. During the process, the insulating sheath G is cut by the "acute portions" H1 of the stripping edges H and H' on the respective stripping cutters 19 and 19', as shown in FIG. 8(c), and the grip 1R is locked.

Figure 8D:
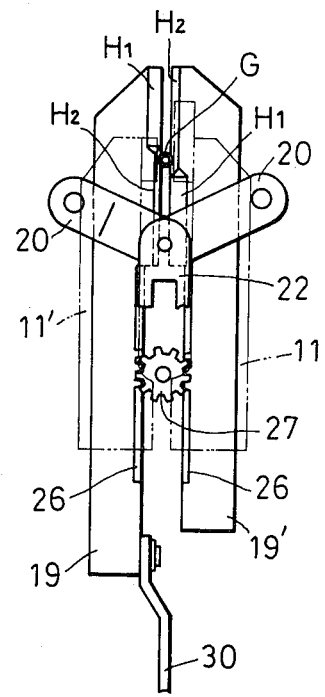
Figure 8E:
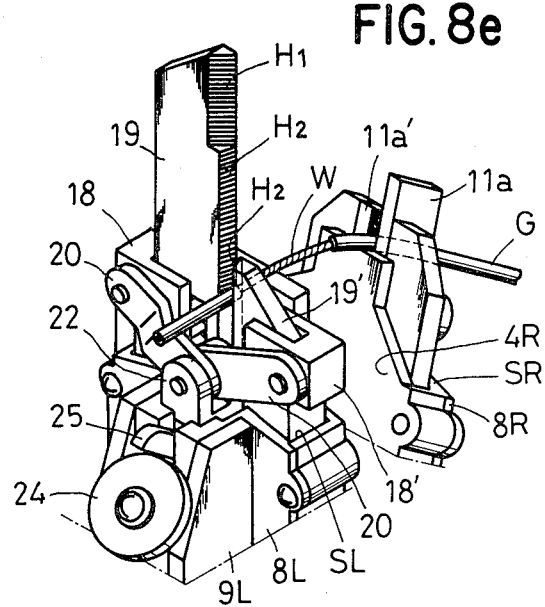
Figure 9A:
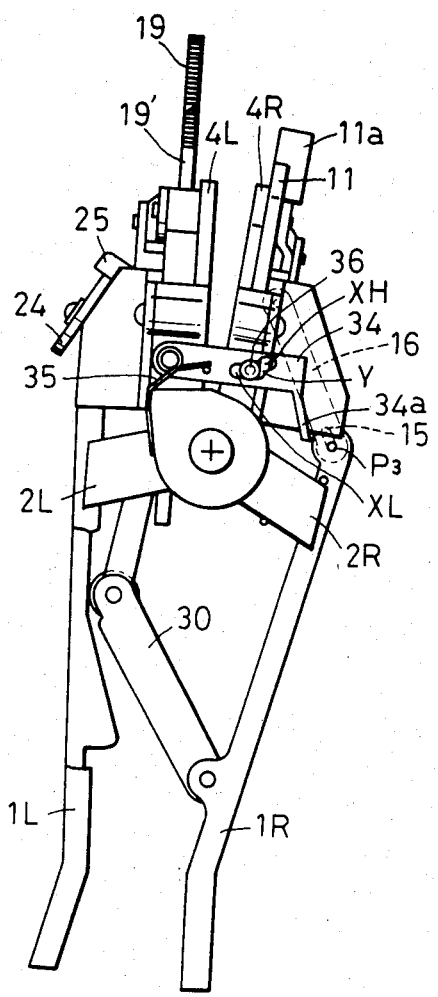

Further grasping operation of the grips 1L and 1R from the locked-position causes each of the base plates 4L and 4R to pivot about the center pin 3 in the relative separating direction, against the force spring 7, as seen in FIG. 8(e). In association with this movement, the guide pin 36 is slided and guided along the slot 37 in the slide plate 34, as generally shown in FIG. 9(a).

Figure 9B:
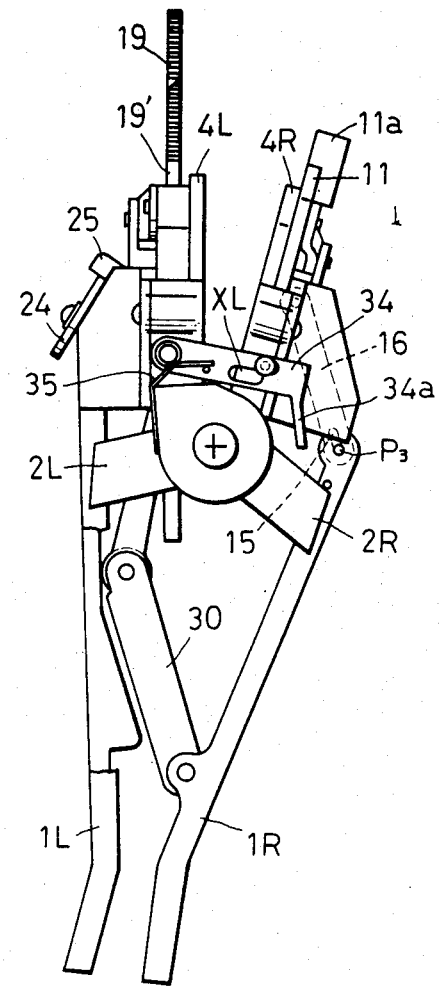

As the consequence, the guide pin 36 is guided along the lower horizontal path XL. As soon as the guide pin 36 reaches the communicating section to the vertical path Y, the slide plate 34 is pivoted downwardly by the torsion spring 35. This causes the guide pin 36 to move relatively upwardly along the vertical path Y, and then to be guided along the upper horizontal path XH to engage with the right-hand end of the upper horizontal path XH, as generally seen in FIGS. 9(b) and 9(c). It is to be noted that, at this moment, the leg portion 34a of the slide plate 34 is spaced from the connecting piece 2R.

Still further grasping operation causes the guide roller 31 to move further upwardly on the guide rail 32, and subsequently the stripping cutters 19 and 19' to move up and down in the opposite direction relative to each other. At this moment, each of the stripping edges H and H' on the stripping cutters 19 and 19' is switched into the "obtuse portion" H2, as shown in FIG. 8(d), and in association with the relative separating motion of the base plates 4L and 4R, the insulating sheath G is imparted both twisting and stripping action with its cut-portion serving as a leading end, as most clearly seen in FIG. 8(e).

It is contemplated that the "obtuse portions" H2 of the stripping edges H and H' are feeble in their cutting capability against the insulating sheath G and effective only to provide clamping and twisting actions. As a result, the insulating sheath G is stripped off as it is twisted by the stripping cutters 19 and 19', and the core wire W thus exposed is twisted substantially throughout the length through the insulating sheath G to be stripped.

Figure 8F:
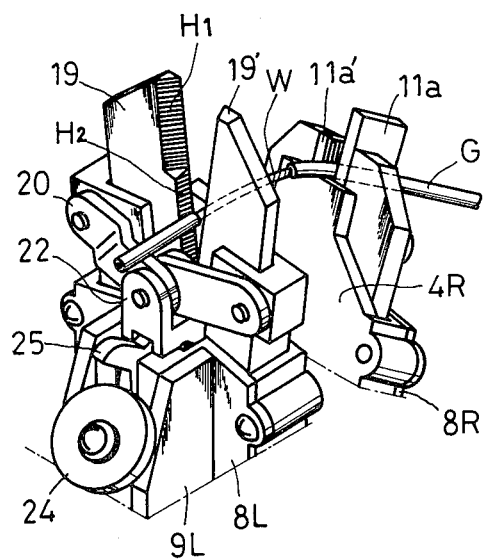

After completion of the stripping operation, the grips 1L and 1R are gradually released to thereby cause the guide pin 36 to return to the left from the right along the upper horizontal path XH in the slide plate 34 until it is temporarily engaged with the corner portion communicating with the vertical path Y. At this moment, the leg portion 34a of the slide plate 34 is brought to contact with the connecting piece 2R, as clearly seen in FIG. 9(d), and as the result, the returning motion of both the base plates 4L and 4R will be once restrained. It is to be noted that, in the meantime, the sliding block 22 returns to its original position, so as to complete the leg-opening motion of the left-hand grip 1L. Furthermore, in accordance with the returning motion of the sliding block 22, the clamping arms 20 are also returned to their original position, so that the stripping cutters 19 and 19', through the casing members 18 and 18', pivot about the support pin P5 in such a manner as to release the wire, as seen in FIG. 8(f). At the same time, the guide roller 31 returns, along the guide rail 32, to its original position, causing the stripping cutters 19 and 19' to move up and down in the opposite direction relative to each other.

Similarly, as soon as the right-hand grip 1R is released, the connecting pin P3 is returned to its original position, that is, the upper end of the slot 15, and the sliding block 14 is moved slightly upward, so that the clamping plates 11a and 11a' may be spaced apart to release the wire.

It should be appreciated that under the condition, the wire is released from the clamped position by the clamping plates 11a and 11a' and the stripping edges H and H'.

From the foregoing condition, the guide pin 36 is displaced to the corner portion communicating the vertical path Y with the lower horizontal path XL. When the grip 1R is further moved in its leg-opening direction, the leg portion 34a of the slide plate 34 is pushed up by the connecting piece 2R in opposition to the torsion spring 35. As the result, the guide pin 36 is released from the locked position at the corner portion, and the base plates 4L and 4R are returned rapidly by the repulsive force of the force spring 7.

Finally, the grips 1L and 1R are fully returned to their original position, so as to complete the whole stripping operation with respect to the wire, providing a stripped and twisted end thereof.

From the foregoing detailed description, the consecutive operation of the inventive stripper may be summarized as follows:

(1) Clamping by the clamping plates 11a, 11a' and the stripping cutters 19, 19', as shown in FIG. 8(b).
(2) Impressing a cut by the "acute portions" H1 of the stripping edges H, H', as shown in FIG. 8(c).
(3) Twisting and stripping by the "obtuse portions" H2 of the stripping edges H, H', in association with the separating motion of the clamping plates 11a, 11a' from the stripping cutters 19, 19', as shown in FIG. 8(e) and FIGS. 9(a) through 9(c).
(4) Releasing the clamping by the stripping cutters 19, 19' and the clamping plates 11a, 11a', as shown in FIG. 8(f) and FIG. 9(d).
(5) Returning of the stripping cutters 19, 19' and the clamping plates 11a, 11a'.

From the foregoing, it will be appreciated that the present invention proposed various features which provide a unique wire stripper not only able to strip and twist a wire simultaneously, but which also uniquely provides for a wide range of wire sizes. The means by which the latter advantage is derived includes the use of an adjusting disc eccentrically attached to the stripper, which is capable of adjusting the relative approaching amount of the stripping cutters 19 and 19'. Moreover, it is to be noted that, unlike the prior art, fine adjustment of the foregoing approaching amount may be accomplished by pivotal operation of the adjusting disc.

While the invention has been particularly shown and described with reference to a preferred embodiment thereof, it will be understood by those skilled in the art that various changes in form and details can be made therein without departing from the spirit and scope of the invention.

What is claimed is:

1. A wire stripper for stripping an insulating sheath of an electrical wire comprising a first grip; a second grip; clamping means operatively connected to said first grip and adapted to clamp the insulating sheath; cutting means operatively connected to said second grip and adapted to slit and twist the insulating sheath, said cutting means having a first stripping cutter and a second stripping cutter both slidably movable in the opposite direction relative to each other in cooperating relationship with actuation of said first grip and said second grip, said first stripping cutter being operatively connected to said first grip, wherein each of said first stripping cutter and said second stripping cutter is defined by an acute edge-angle portion adapted for cutting the insulating sheath and an obtuse edge-angle portion adapted for twisting the insulating sheath; and stripping means connecting said clamping means to said cutting means and effective to strip off the insulating sheath.

2. The invention as defined in claim 1, wherein each of said first stripping cutter and said second stripping cutter further comprises rack means formed on a generally lower portion thereof for meshing engagement with a cooperating pinion means interposed between said first stripping cutter and said second stripping cutter and operatively carried in said cutting means.

3. The invention as defined in claim 1 wherein said first grip and said second grip are pivotably connected by a pin means and normally urged by a spring means in their fully opened position.

4. The invention as defined in claim 1 wherein said clamping means operatively connected to said first grip includes a pair of clamping members adapted to clamp the insulating sheath in cooperating relationship with actuation of said first grip.

5. The invention as defined in claim 4 wherein said clamping members include a stopper means for limiting actuation of said clamping members upon their clamping the insulating sheath and for subsequently limiting the clamping force being applied to the insulating sheath.

6. The invention as defined in claim 1 wherein said cutting means operatively connected to said second grip includes means for approaching and separating said first stripping cutter to and from said second stripping cutter in cooperating relationship with actuation of said second grip.

7. The invention as defined in claim 1 wherein said cutting means further includes means for adjusting the relative approaching amount of both said first stripping cutter and said second stripping cutter in accordance with the objective wire size.

8. The invention as defined in claim 1 wherein said stripping means connecting said clamping means to said cutting means includes a pair of separating means normally placed in their closed position which serve to separate said clamping means from said cutting means when said first grip and said second grip are moved a predetermined distance into their closed position.

* * * * *